United States Patent [19]

Fink

[11] 4,392,346
[45] Jul. 12, 1983

[54] COGENERATION PROCESS USING AUGMENTED BRAYTON CYCLE

[75] Inventor: Allen H. Fink, Des Plaines, Ill.

[73] Assignee: UOP Inc., Des Plaines, Ill.

[21] Appl. No.: 234,070

[22] Filed: Feb. 12, 1981

Related U.S. Application Data

[63] Continuation-in-part of Ser. No. 171,225, Jul. 22, 1980, Pat. No. 4,338,788.

[51] Int. Cl.³ .............................................. F02C 6/00
[52] U.S. Cl. .................. 60/39.04; 60/39.17; 60/39.511
[58] Field of Search ................ 60/39.02, 39.15, 39.17, 60/39.18 R, 39.18 C, 39.19, 39.51 R, 39.04

[56] References Cited

U.S. PATENT DOCUMENTS

| | | | |
|---|---|---|---|
| 3,076,769 | 2/1963 | Pfeiffer | 252/417 |
| 3,104,227 | 9/1963 | Pfeiffer et al. | 252/417 |
| 3,247,129 | 4/1966 | Roelofsen et al. | 252/417 |
| 3,401,124 | 9/1968 | Goulden | 252/417 |
| 3,536,609 | 10/1970 | Stine et al. | 208/72 |
| 3,742,702 | 7/1973 | Quinn | 60/39.51 R |
| 4,006,075 | 2/1977 | Luckenbach | 208/164 |
| 4,051,013 | 9/1977 | Strother | 208/78 |
| 4,109,469 | 8/1978 | Carson | 60/676 |
| 4,224,299 | 9/1980 | Barber et al. | 423/360 |
| 4,238,925 | 12/1980 | Lowther | 60/39.51 R |

OTHER PUBLICATIONS

Gas Turbine Principles and Practice, H. R. Cox Editor, Published by D. Van Nostrand Company, New York, New York, (1955), pp. 2-3, 2-26 and 2-40.
The Oil and Gas Journal, Nov. 19, 1979, "FCC Power Recovery Saves ?18 Million at Refinery," pp. 164-168.
The Oil and Gas Journal, May 22, 1978, "FCC Advances Merged in New Design" by W. D. Ford et al., pp. 63-68.

Primary Examiner—Louis J. Casaregola
Attorney, Agent, or Firm—James R. Hoatson, Jr.; John F. Spears, Jr.; William H. Page, II

[57] ABSTRACT

A cogeneration system which produces electrical power through the use of an augmented Brayton cycle is disclosed. A pressurized air stream from an industrial source, such as a petroleum refinery, is heated by indirect heat exchange against a turbine effluent stream and is then depressurized in a turbine which drives an electrical generator. Preferably, a high temperature gas stream which also is simultaneously depressurized in the same turbine is admixed into the heated air stream before the air stream enters the turbine. A portion of the air stream may be heated in a supplemental combustion zone rather than by heat exchange.

9 Claims, 1 Drawing Figure

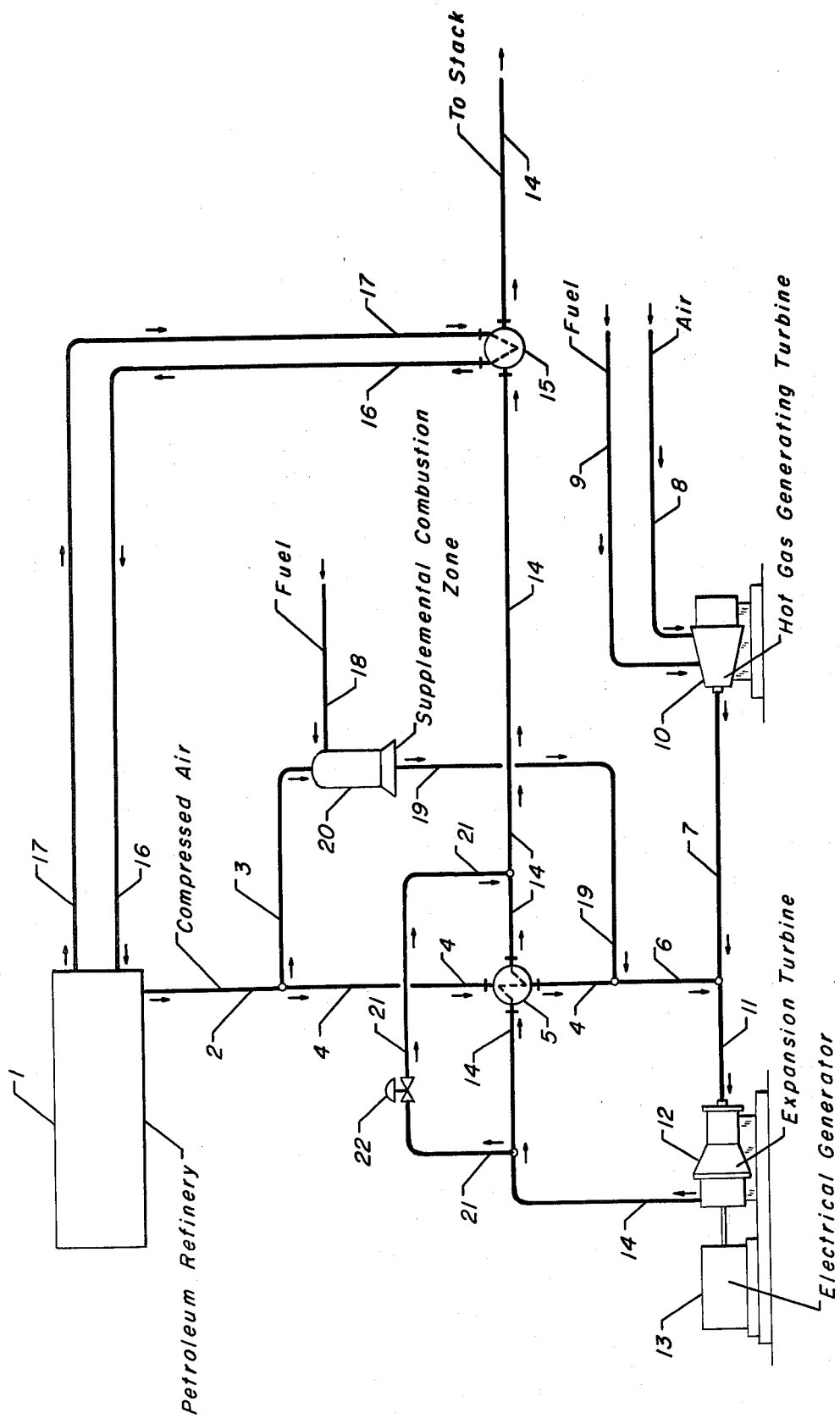

COGENERATION PROCESS USING AUGMENTED BRAYTON CYCLE

CROSS-REFERENCE TO RELATED APPLICATION

This application is a continuation-in-part of my prior application Ser. No. 171,225 filed on July 22, 1980 and issued as U.S. Pat. No. 4,338,788 on July 13, 1982. The entire teaching of my prior application is incorporated herein by reference.

FIELD OF THE INVENTION

The invention relates to a power producing cycle referred to as the Brayton cycle. The invention therefore relates to a process for recovering useful energy from a high temperature gas stream by depressurizing the gas stream in a turbine type device. A specific application of the invention is the production of electrical energy as part of a cogeneration process which links together an industrial facility and an electrical generating plant.

PRIOR ART

The Brayton cycle is well known to those skilled in the art and is described at pages 2-3, 2-26 and 2-40 of *Gas Turbine Principles and Practice*, H. R. Cox editor, published by D. Van Nostrand Company, New York, New York, (1955). In the simple Brayton cycle a fuel is burned in a pressurized combustor located between the compressor discharge and a turbine in which the hot gases are depressurized. All of the hot combustion gases are depressurized to the minimum available outlet pressure in the turbine, with energy being recovered from the turbine.

In a regenerated Brayton cycle heat is recovered from the hot gases which have been depressurized in the turbine by heat exchanging these hot gases with compressed air which is entering the combustion zone. The air is thereby heated prior to entering the combustion zone. This decreases the amount of fuel required and improves the thermal efficiency of the power cycle.

In a second variation of the simple Brayton cycle a second combustion zone is employed in the middle of the gas depressurizing step to maximize the temperature of the expanding gas. This is performed with a regenerator (heat exchanger) as described above to further improve the cycle's thermal efficiency. This variation is referred to as a reheat-regenerated brayton cycle.

The subject invention may be employed with any source of moderately warm superatmospheric air, but is preferably operated as part of a cogeneration process linking the catalyst regeneration section of a fluidized catalytic cracking (FCC) unit and an electrical generating plant. Fluidized catalytic cracking units are in very widespread commercial use and are found in most major refineries. They are described in U.S. Pat. Nos. 4,051,013; 3,536,609 and 4,006,075.

Recovering energy from the flue gas stream of the FCC regenerator through the use of a power recovery expander is well known and is performed commercially. The economics of this is discussed and a flow diagram of the power recovery system is provided in an article at page 164 of the Nov. 19, 1979 edition of *The Oil and Gas Journal*. An article of FCC operation which includes a diagram of the flow of regenerator flue gas through a power recovery unit is presented at page 63 of the May 22, 1978 edition of *The Oil and Gas Journal*.

FCC regenerator flue gas power recovery systems are also described in U.S. Pat. Nos. 3,076,769; 3,104,227 and 3,247,129 (all Cl. 252-417). U.S. Pat. No. 3,401,124 also presents a flue gas power recovery system using an expander turbine. This reference shows the generation of electrical energy by depressurizing flue gas through a turbine, which drives an electrical generator and an air compressor.

The cogeneration concept in which divergent industrial facilities are linked together for synergistic power generating economics is also well-known. For example, U.S. Pat. No. 4,109,469 (Cl. 60-676) describes a process in which a petroleum refinery is linked to an off-site electric generating facility. Vapors formed by indirect heat exchange against one or more waste heat streams of the refinery are depressurized in a turbine connected to an electrical generator.

SUMMARY OF THE INVENTION

The invention provides a new type of Brayton cycle referred to herein as the augmented Brayton cycle. In this cycle a warm superatmospheric pressure air stream is further heated by exchange against the depressurized hot turbine effluent stream and is then passed into the turbine to be depressurized along with the hot gas stream produced in the combustion zone. Differences from the previously described variations in the Brayton cycle include that the heated air stream is not the air stream consumed in the primary combustion zone and that gas flow through the expansion turbine is greater than the gas flow delivered by the hot gas generator section of the Brayton cycle.

One broad embodiment of the subject invention may be characterized as a power producing cycle which comprises the steps of heating a feed air stream having a pressure above 15 psig and a temperature above 65° C. by indirect heat exchange against at least a portion of a hereinafter characterized turbine effluent stream and thereby heating the feed air stream to a temperature above 370° C.; admixing and depressurizing the feed air stream and a superatmospheric pressure high temperature gas stream in a turbine which drives an electrical generator and thereby producing the turbine effluent stream; and, cooling the turbine effluent stream by indirect heat exchange against the feed air stream.

BRIEF DESCRIPTION OF THE DRAWING

The Drawing is a simplified flow diagram showing how a compressed air stream delivered in line 2 from a petroleum refinery is heated in heat exchange means 5 and then passed into a simple Brayton cycle. A second portion of the air is passed through a supplemental combustion zone 20. The hot air and hot gases from the turbine 10 are depressurized in the expansion turbine 12, and the turbine effluent is cooled by heat exchange against the entering compressed air before passing to a stack through line 14.

DETAILED DESCRIPTION

The escalating costs of energy have increased the feasibility of new designs and practices which provide more efficient recovery and utilization of fossil fuel energy. One area which has received increased attention is the establishment of cogeneration facilities. A cogeneration facility is a complex in which a power plant, typically an electric generating plant, is linked with an industrial facility such as a petrochemical complex or a petroleum refinery. The objective of this linkage is to increase the overall efficiency of the utilization of energy in the entire complex through the distribution of various forms of low level energy in a manner which allows their greater utilization. Energy which is available in one part of the facility in a form which renders its use impractical at that point is therefore transferred to a different part of the complex in which it may be at least partially recovered. For instance, low pressure steam which is being discharged from the turbine of an electric power generating station may be transported to an industrial facility at which it is condensed during the heating of a low temperature process stream circulated within this facility. Cogeneration is also often characterized as the simultaneous production of mechanical and thermal energy.

One very important criteria in the design of cogeneration facilities is the reliability of the individual units which are linked together to form the facility and the impact on the operation of one unit which would occur if a different unit was shut down for either scheduled maintenance or because of equipment failure. It is important that a stoppage, or a change in production rates, in one part of the cogeneration facility does not adversely affect the operation of another part of the facility. If a cogeneration facility is too highly integrated, then the overall operation of the facility becomes more complex and difficult and the operational reliability of the entire complex decreases.

A second factor which must be considered in the design of cogeneration facilities is the increased cost of linking the individual units of the facility compared to their erection and operation as separate units. The net advantage of the cogeneration facility must of course exceed these costs. A third factor, which is also related to economics, is the problem of monitoring and pricing the energy equivalents which are being transferred between the units of the cogeneration facility. It is therefore advisable that the units of the cogeneration facility are linked by a small number of process flow streams and that the flow rates and equivalent energy contents of these streams are easy to determine. This third factor is most relevant when parts of the facility are owned by different parties.

It is an objective of the subject invention to provide a new type of Brayton power cycle. It is a further objective to provide a Brayton cycle which is highly suitable for use in cogeneration systems. It is another objective of the subject invention to provide a cogeneration process suitable for application with one or more industrial installations which may convert excess low level energy into compressed air.

A Brayton power cycle may be characterized as comprising the combustion of a fuel in a compressed air stream in a combustion zone located between an air compressor and an expansion or power turbine in which the resultant hot gases ae depressurized. The air compression and combustion may occur in separate units, but they are commonly integrated into a single unit referred to herein as a hot gas generator or hot gas generating turbine. Such an integrated unit is preferred for use in conjunction with the subject invention and is exemplified by the "aircraft derivative" units often employed as hot gas generators. In a prior art form of the Brayton cycle only this hot gas stream is passed into the expansion turbine which is linked to an electrical generator, compressor, or other driven apparatus. The variations in the Brayton cycle previously described do not change this, and the mass flow through the expansion turbine is equal to the mass flow delivered by the hot gas generator section of the cycle.

In the subject invention the mass flow into the expansion turbine exceeds the mass flow leaving the hot gas generator section of the power cycle. This increase in the mass flow is in the form of air, and also possibly a mixture of air and combustion gases, which is also charged to the expansion turbine in addition to the hot gases produced in the hot gas generator. This air flow is received from an industrial facility in which excess low level heat or other available energy is used to compress air to a pressure near that of the hot gases which normally enter the expansion turbine. This compression will normally produce a relatively warm air stream having a temperature above 35° C., with higher temperatures being preferred. The air stream is further heated by indirect heat exchange against the expansion turbine effluent or by combustion prior to entering the expansion turbine. Since power is recovered from additional air passed into the cycle, the power cycle of the subject invention is referred to herein as a power-air augmented Brayton cycle.

The basic inventive concept and two variations of the basic inventive concept are illustrated in the Drawing. A feed stream of compressed air is produced in a petroleum refinery 1 and carried to the subject process in line 2. This feed air stream will preferably have a temperature between about 160° C. and 232° C. (320°–450° F.) and a pressure between about 20 and about 50 psia. All of the feed air stream may pass through line 4 or a minor portion equal to less than 50 mole percent may be divided off into line 3. The compressed air flowing through line 4 is passed through a recuperative indirect heat exchange means 5 and is heated to a temperature between about 426° C. and 510° C. (800°–950° F.) and preferably to a temperature between about 441° C. and about 496° C. If a portion of the main feed air stream is passed into line 3, this air is heated in a supplemental combustion zone 20 through the combustion of fuel entering this zone through line 18. The effluent stream of the supplemental combustion zone, which will be a mixture of residual air and combustion products, will preferably have a temperature between about 480° C. and about 620° C. (896°–1150° F.). The supplemental combustion zone effluent stream is passed through line 19 and admixed with the heated compressed air carried by line 4, and the resultant admixed gases are passed into an expansion turbine 12 through lines 6 and 11. In an alternative embodiment not shown in the Drawing, line 6 may direct these gases into the expansion turbine separately from the hot gas being carried by line 7.

Under normal operating conditions, the majority of the gases entering the expansion turbine 12 are produced in a hot gas generating turbine 10. Air entering this turbine through line 8 is compressed and then passed into a combustion zone in the hot gas generating turbine. A gaseous or liquid fuel from line 9 is consumed within the combustion zone and there is thereby produced a hot gas generating turbine effluent stream which is referred to herein as the hot gas stream. This hot gas stream will preferably have a temperature between about 675° C. and about 734° C. (1250°–1350° F.) and a superatmospheric pressure less than approximately 50 psia. The effluent stream of the hot gas generating turbine is comprised of residual air and combustion products.

The heated supplemental power air stream carried by line 6 is admixed with the hot gas stream carried by line 7 and passed into the expansion turbine 12 through line 11. The motive gas stream formed by the admixture of these two streams will preferably have a temperature between about 593° C. and 648° C. (1100°–1200° F.). The motive gas stream is depressurized within the turbine to produce a turbine effluent stream having both a lower temperature and pressure. The turbine effluent stream will normally have a pressure less than about 20 psia and a temperature of from about 454° C. to about 510° C. (850°–950° F.). The motive energy recovered in the expansion turbine is transferred to an electrical generator 13 or some other rotating driven apparatus. The expansion turbine effluent stream is carried by line 14 through the indirect recuperative heat exchange means 5 wherein heat is transferred from the expansion turbine effluent stream to the entering air stream carried by line 4. The thus-cooled expansion turbine effluent stream is then carried through line 14 to a second indirect heat exchange means 15 wherein additional heat is recovered. Preferably this heat recovery takes the form of the heating or vaporization of a fluid stream carried from the refinery in line 17 and returned to the refinery through line 16. Additional heat exchange means may be employed to recover any remaining useful heat energy, with the turbine effluent stream then being carried to a stack or any necessary pollution control facilities through line 14. In a second variation of the basic process, a portion or all of the expansion turbine effluent stream may be passed through line 21 at a rate controlled by a valve means 22. This bypass option would be utilized when it is desired to recover more heat in the indirect heat exchange means 15 or if there was a reduction or temporary stoppage of the feed air stream flowing through line 2.

Those skilled in the art will appreciate that other variations to the basic inventive concept besides those shown in the Drawing are possible. The Drawing has been limited to showing the preferred embodiments of the invention to simplify its presentation and without intent to limit the invention to just the illustrated embodiments. For instance, one design option is to incorporate the supplemental combustion zone and bottom recovery heat exchanger, such as heat exchanger 15, into the gas turbine cycle as part of a conventional reheat-regeneration configuration. Other design options may arise if the hot gas generating system is other than the preferred aircraft derivative type.

The source of the compressed air feed stream or streams which enter the subject process as power augmentation air is subject to considerable variation and is basically limited only by economics and the engineering practicality of the particular potential air source. The air source is therefore not limited to the catalyst regeneration sections of FCC units which are described in some detail below. It is contemplated that the subject power cycle may be economically applied to nitric acid producing facilities and synthetic fuel plants used to convert coal or other materials to liquid fuels or gaseous fuels. The compressed air source may also be powered by the combustion of solid waste materials such as municipal garbage or tree bark. In one specific embodiment of the invention several small air streams are produced at a multiplicity of different locations and then combined to form the air feed stream. These streams could vary substantially in size and to a lesser extent in temperature and pressure and could be produced at entirely different industrial facilities. The air which is compressed to form the feed stream or streams may be air which has been heated to an above ambient temperature. For instance, air is often used as a cooling medium in petroleum or petrochemical plants. This air which has been heated in this way may be collected in a suitable ductwork leading to the inlet of the feed air compressor.

Most major petroleum refineries contain a unit referred to as a fluidized catalytic cracking unit. The function of this unit is to break down high molecular weight hydrocarbons into smaller, lower molecular weight hydrocarbons. A fluidized catalytic cracking unit, also referred to herein as an FCC unit, is therefore a way to provide heavy hydrocarbons to products having a higher economic value. A typical feed stream to an FCC unit is a gas oil, such as an atmospheric or vacuum gas oil, having an initial boiling point, as determined by the appropriate distillation method, above about 450° F. A lighter feedstock including material boiling at 400° F. or lower or a feedstock comprising a heavier hydrocarbon, such as a reduced crude or heavy vacuum gas oil, may also be fed to the FCC unit. An example of such a heavier feedstock would be a distillate containing 60 vol.% hydrocarbonaceous compounds having atmospheric boiling points, as determined by the appropriate standard test method, above 650° F. The products derived from the FCC unit typically include a sizable amount of naphtha, kerosene, and a slightly heavier fuel oil. These streams may then be finished to the established product specifications for gasoline, jet fuel, and diesel fuel, respectively. An FCC unit will also produce some heavier material and a sizable amount of lighter hydrocarbon including virtually all of the more common $C_5-$ acyclic hydrocarbons. These light hydrocarbons are separated and recovered along with some naphtha in a unit of the refinery referred to as a gas concentration unit. The gas concentration unit will often supply the refinery with one or more streams which are rich or at least have a high content in light olefins, such as ethylene and butylene, which are consumed in downstream alkylation or polymerization units to produce such products as high octane gasoline blending components and alkylaromatics including ethylbenzene.

An FCC unit comprises a reaction zone and a catalyst regeneration zone. In the reaction zone the feed stream is contacted with a finely divided fluidized catalyst maintained at elevated temperatures and a moderate positive pressure. This contacting causes the conversion of the feed stream to the more volatile products which are recovered from a vaporous effluent stream of the reaction zone and the accumulation of carbonaceous deposits referred to as coke on the catalyst. These deposits lessen the catalytic effectiveness of the catalyst. To overcome the activity reduction caused by the coke deposits, a stream of used catalyst is continuously removed from the reaction zone and transferred into the regeneration zone of the FCC unit. The entering catalyst joins a bed of fluidized catalyst retained within the regeneration zone and is contacted with a pressurized stream of air under a high temperature condition such that the carbonaceous deposits on the catalyst are combusted within the regeneration zone. This burning of the coke results in a reactivation or regeneration of the catalyst and also produces a very large amount of heat. Some of this heat may be removed from the regeneration zone in heat exchange, as by the generation of stream.

A sizable amount of the heat liberated by the combustion of the coke is removed from the FCC regeneration zone by the continuous withdrawal of a stream of hot regenerated catalyst, which is then passed back into the FCC reaction zone. This circulation of catalyst therefore serves the dual roles of supplying regenerated catalyst to reaction zone and supplying the required heat to maintain the desired cracking conditions within the reaction zone. Further details on the operation of an FCC unit may be obtained by reference to the previously cited references or to U.S. Pat. Nos. 4,197,189 and 4,198,287. Since the FCC unit performs a central role in the overall operation of the refinery, and since the operation of the regeneration zone is necessary for the operation of the reaction zone, it is extremely important to the overall operation of the refinery that a highly dependable means is used to supply compressed air to the FCC regeneration zone.

The air supply to the regeneration zone of an FCC unit is usually produced through the use of either a centrifugal type or an axial type air compressor. This compressor may be driven by conventional means such as an electric motor or a steam driven turbine. These drivers are normally directly connected to the compressor in larger FCC units, and in smaller FCC units are connected to the compressor through the use of one or more gear trains which adjust the rotational speed of the various components of the air supply system. The air supply stream to the regeneration zone will normally have a superatmospheric pressure less than about 60 psig. A preferred range of this pressure is from 25–55 psig. The very large amounts of air which are required result in a sizable utilities cost if this air compressor is driven by an electric motor or other conventional means. Therefore, it is becoming a common and predominant practice to have the air compressor in a large refinery driven by a power recovery unit which receives as its motive stream the flue gas stream of the FCC regeneration zone. These systems are described in the previously referred to references. Any reference herein to "small" or "smaller" FCC units is intended to indicate an FCC unit designed for a feed rate of less than about 25,000–30,000 barrels per day.

The flue gas stream which is removed from the regeneration zone has already passed through one or more separators located in the regeneration zone designed to remove the majority of the catalyst particles from the flue gas stream. However, it is normally necessary to pass the flue gas stream through at least one tertiary particle separation zone to further reduce the concentration of highly erosive fine catalyst particles prior to passage of the flue gas stream through the power recovery unit. Separators intended for this purpose are described in U.S. Pat. Nos. 2,941,621; 2,986,278; and 3,415,042. A power recovery expander is a turbine type device in which the flue gas stream is depressurized to a slightly superatmospheric pressure and which converts a portion of the energy stored in the hot pressurized flue gas stream to useful rotational power. The flue gas stream is then passed to the appropriate heat recovery facilities, pollution control facilities or directly to the stack where it is vented to the atmosphere.

When properly designed, installed and operated, the combination of a power recovery expander and either a centrifugal or axial air compressor is very dependable and will give long periods of uninterrupted service. However, since the air supply is so essential to the operation of the FCC unit which in turn is central to the operation of the refinery, it is a common practice to store at the refinery spare major machine components which may be rather quickly installed as replacement parts to minimize refinery downtime. The refinery would prefer, but heretofore could not economically justify, having an entire spare air compressor and driver which are not normally utilized but are present only as a stand-by system for the primary air compressor of the FCC unit.

In practicing the subject invention the power recovery expander is mechanically connected to the stand-by or auxiliary air compressor which produces the feed air stream to the augmented Brayton cycle. The primary air compressor for the FCC regeneration zone is driven by a conventional driver and normally provides the air stream which is fed into the FCC regeneration zone. The pressurized air stream which is produced by the stand-by air compressor is sold "over the fence" for use in the subject process. The inventive concept therefore does not involve the generation of electricity at the refinery using the power recovery expander although the subject process could be employed entirely within a refinery with the electrical energy being used within the refinery. If the primary air compressor fails due to either a problem with the driver or the compressor, then the pressurized air stream being produced by the stand-by air compressor, which is of course already running, is used as the air supply stream to the FCC regeneration zone. That is, the "spare" air compressor located at the refinery is always kept on stream producing the power air stream rather than sitting idle. This is an economically viable situation for the refinery due to the revenue received from the electrical utility.

The rotational motive energy delivered by the expansion turbine may be used for a wide variety of purposes. It could, for instance, be used to operate compressors or pumps in a refinery, LNG liquefaction plant, or pipeline terminal. Preferably, the expansion turbine is connected through the appropriate gear drive means to an electrical generator and the subject invention is integrated into an electrical power producing process. This embodiment of the inventive concept may be characterized as a process for generating electrical energy which comprises the steps of dividing a first air stream having a pressure above 15 psig and a temperature above 65° C. into a second air stream and a third air stream; passing the second air stream into a combustion zone in which a combustible fuel is oxidized and thereby producing a combustion zone effluent stream having a higher temperature than the second air stream; heating the third air stream by indirect heat exchange against a hereinafter characterized turbine effluent stream; and admixing the combustion zone effluent stream, the third air stream and a high temperature gas stream, depressurizing the resultant admixture in a turbine which delivers rotational energy to an electrical generator, and thereby producing the turbine effluent stream.

The subject process has advantages for both industrial units when used as part of a cogeneration process linking a petroleum refinery and an electrical power plant. The overall process requires a minimum of additional capital investment compared to the individual refinery and power generation station. There is only a single tie-in between the refinery and the power plant, with the overall flow being simple and providing a minimum number of flow control problems. Furthermore, each unit of the cogeneration facility may operate entirely independently of the other component of the facility. An advantage which is specific to the refinery is the fact that the spare air compressor for the FCC regeneration zone is on-stream and available when needed. This assures the refinery that there will be no operational problem or extended lag time in the startup of the spare air compressor. A second advantage to the refinery is that the expensive capital equipment represented by the spare air compressor and its accessories is being fully utilized in a profit generating capacity rather than sitting idle. The utility is benefited since it receives a motive stream which may be used to generate electricity thereby reducing the overall fuel consumption at the utility. Further, the heated air of this motive stream is pollution-free when discharged to the atmosphere, thereby lowering the total potential discharge of atmospheric pollutants from the utility.

In order for the refinery to utilize the subject invention, it is of course necessary for the primary air compressor to be linked to its drive means and for the secondary air compressor to be linked to the power recovery expander through suitable mechanical drive trains. It is also necessary to provide the necessary air flow conduits which interconnect the outlets of each of the air compressors to the line which feeds the air into the FCC regeneration zone. It is also preferred that a flow control system is provided which automatically terminates the flow of the pressurized air stream produced by the stand-by air compressor to the utility when this air is required for use in the FCC regenerator. This flow control system could monitor the rate at which air is supplied to the regeneration zone and either partially or totally restrict the opening through the valve which controls the flow of the air from the refinery to the utility. Other control systems normally used on equipment of this nature, such as expander speed control systems, will also be present.

I claim as my invention:

1. A power producing cycle which comprised the steps of:
   (a) heating a feed air stream having a pressure above 15 psig and a temperature above 65° C. by indirect heat exchange against at least a portion of a hereinafter characterized turbine effluent stream and thereby heating the feed air stream to a temperature above 370° C.;
   (b) admixing the feed air stream and a high temperature gas stream and forming a power gas stream;
   (c) heating a second air stream in a combustion zone;
   (d) admixing said second air stream after heating with said high temperature gas stream prior to passage into a hereinafter characterized turbine;
   (e) depressurizing the power gas stream in a turbine and thereby producing the turbine effluent stream; and
   (f) cooling the turbine effluent stream by indirect heat exchange against the feed air stream of step (a).

2. The process of claim 1 further characterized in that the high temperature gas stream is produced by one or more turbine-type gas generators.

3. The process of claim 1 further characterized in that the feed air stream is heated to a temperature of about 441° to about 496° C. by heat exchange against the turbine effluent stream.

4. A process for producing rotational energy which comprises the steps of:
   (a) dividing a first air stream having a pressure above 15 psig and a temperature above 65° C. into a second air stream and a third air stream;
   (b) passing the second air stream into a combustion zone in which a combustible fuel is oxidized and thereby producing a combustion zone effluent stream having a higher temperature than the second air stream;
   (c) heating the third air stream by indirect heat exchange against at least a portion of a hereinafter characterized turbine effluent stream; and,
   (d) admixing the combustion zone effluent stream, the third air stream and a high temperature gas stream, depressurizing the resultant admixture in a turbine which delivers useful rotational energy and thereby producing the turbine effluent stream.

5. The process of claim 4 further characterized in that the third air stream is heated to a temperature between about 441° to about 496° C. by indirect heat exchange.

6. The process of claim 4 further characterized in that the high temperature gas stream has a temperature between about 675° C. and about 734° C. and is produced in one or more turbine type gas generators.

7. The process of claim 4 further characterized in that a multiplicity of compressed air streams are admixed to form the first air stream.

8. The process of claim 4 further characterized in that the useful rotational energy delivered by the turbine is used to operate a compressor.

9. The process of claim 4 further characterized in that the useful rotational energy delivered by the turbine is used to generate electricity.

* * * * *